United States Patent
Orendorff

[15] 3,635,495
[45] Jan. 18, 1972

[54] TELESCOPING IMPLEMENT TONGUE
[72] Inventor: John W. Orendorff, Downers Grove, Ill.
[73] Assignee: International Harvester Company, Chicago, Ill.
[22] Filed: Nov. 28, 1969
[21] Appl. No.: 880,584

[52] U.S. Cl..................................280/415, 280/34, 280/482
[51] Int. Cl.......................................................B62d 53/00
[58] Field of Search ....................280/491, 482, 415 R, 34 A; 172/248, 625

[56] References Cited

UNITED STATES PATENTS

| | | | |
|---|---|---|---|
| 2,320,046 | 5/1943 | Notar | 280/482 |
| 2,327,308 | 8/1943 | Johnston | 280/482 |
| 3,240,005 | 3/1966 | Rowse | 280/415 R |
| 3,428,336 | 2/1969 | Thurman | 280/482 |
| 3,515,408 | 6/1970 | Cagle | 289/415 |

Primary Examiner—Benjamin Hersh
Assistant Examiner—Robert R. Song
Attorney—Floyd B. Harman

[57] ABSTRACT

A transversely elongated trailing implement adapted to be endwise transported to reduce its width has an operating draft tongue which projects forwardly from the implement frame for connection to a tractor and has a sliding association with the implement frame allowing the tongue to be telescoped rearwardly to a storage position within the front and rear confines of the frame when the implement is to be endwise transported.

2 Claims, 6 Drawing Figures

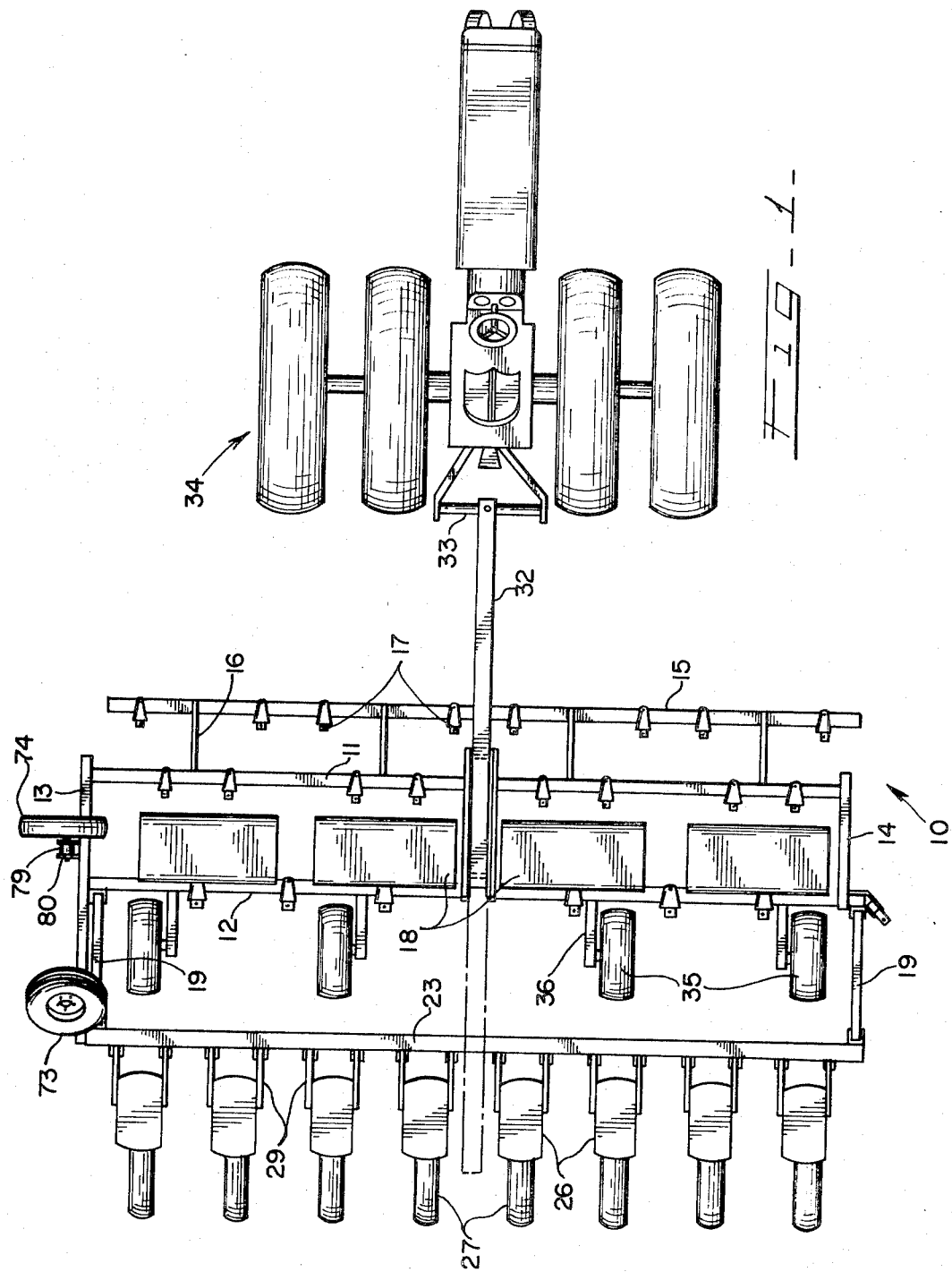

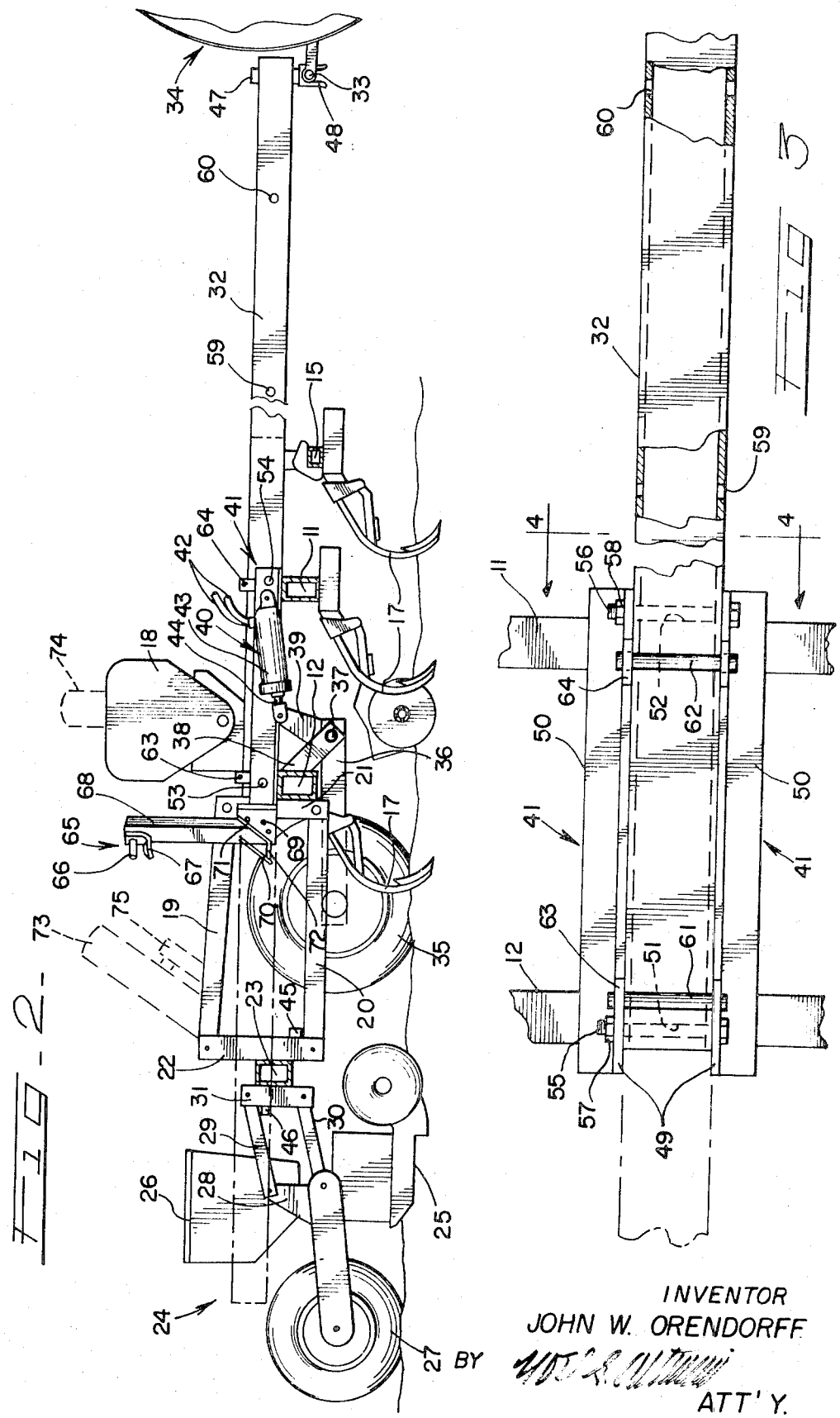

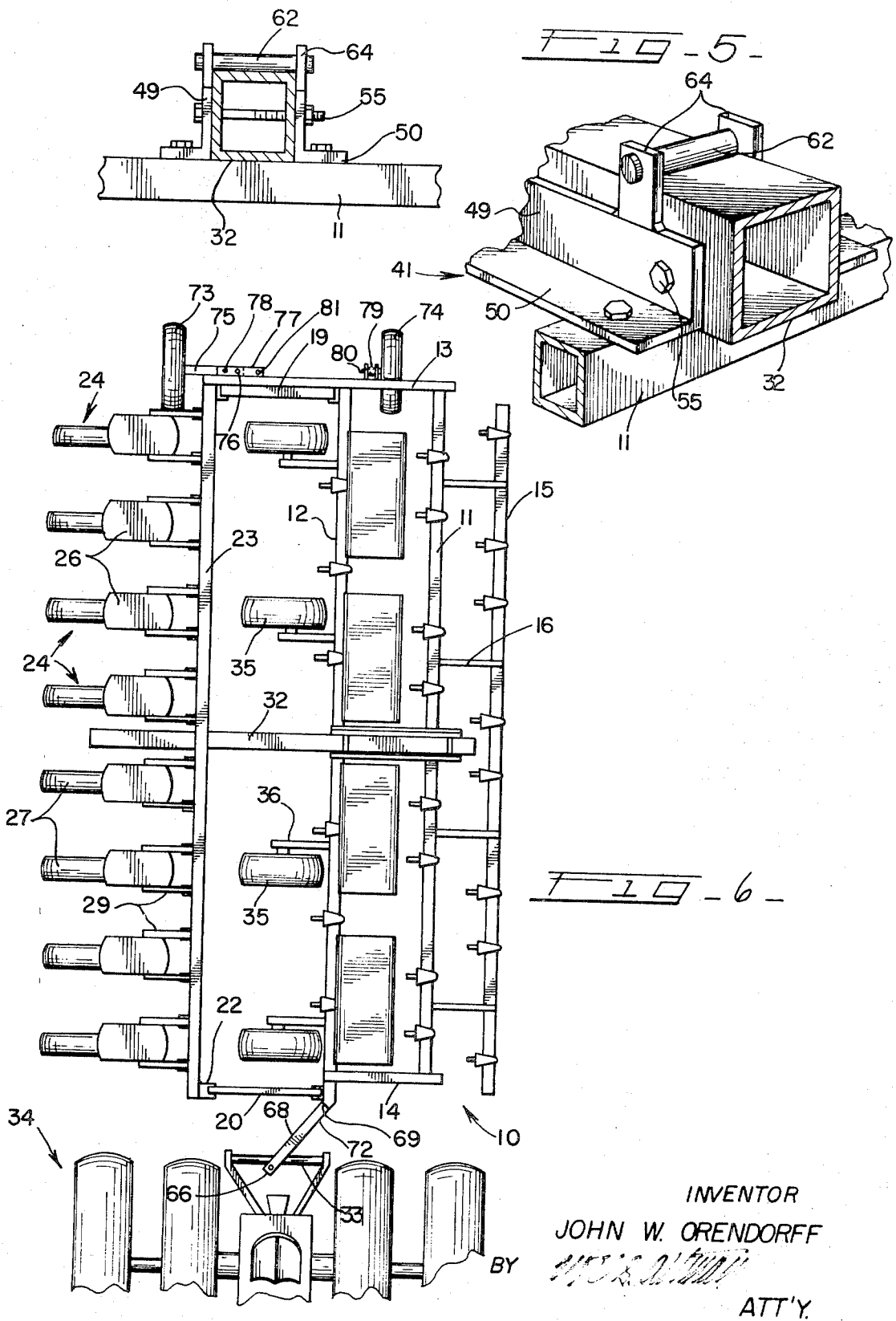

TELESCOPING IMPLEMENT TONGUE

BACKGROUND OF THE INVENTION

A trail-behind implement of the widespread type such as a multirow planter or the like having a relatively small front-to-rear dimension is customarily provided with an elongated forwardly projecting draft tongue for connection to the tractor by means allowing the implement to swing laterally relative to the tractor when turning as at the end of the field, with minimum likelihood of the implement engaging one of the tractor wheels.

Such a widespread implement cannot be safe to transport it over highways and cannot pass through gates, and provision is usually made to disconnect the operating tongue from the tractor and to connect the tractor to one end of the frame to transport the implement endwise. The then laterally projecting operating tongue on the transport conditions becomes a hazard, and removal of the tongue has been time consuming and unsatisfactory. Therefore, the present invention has for its object the provision of an implement having an operating draft tongue assembly which is quickly and easily moved to a position within the confines of the frame and secured there during endwise transport of the implement.

Another object of the invention is the provision of an improved draft tongue assembly for an implement of the widespread type adapted for endwise transport, wherein the tongue is locked in its operating position and is releasable for telescoping rearwardly within the frame so that substantially no part thereof projects laterally during endwise transport of the implement.

DESCRIPTION OF THE DRAWINGS

FIG. 1 is a diagrammatic plan view of a tractor having connected thereto an implement incorporating the features of this invention, shown in its operating position;

FIG. 2 is a view in side elevation of the rear end of a tractor having the implement of this invention connected thereto in its operating position;

FIG. 3 is an enlarged detail in plan showing the manner in which the draft tongue is mounted on the implement frame;

FIG. 4 is a section taken on the line 4—4 of FIG. 3;

FIG. 5 is a sectional detail in perspective of a portion of the structure shown in FIG. 3; and FIG. 6 is a diagrammatic plan view similar to FIG. 1 showing the connection of the implement of this invention to the tractor in its endwise transport position.

DESCRIPTION OF THE PREFERRED EMBODIMENT

The implement shown in the drawings is a harrow planter which simultaneously prepares the soil, deposits fertilizer, and plants seed, and has a main frame 10 extending transversely of the direction of travel in the operating position. Frame 10 comprises a pair of longitudinally spaced beams 11 and 12 connected by side bars 13 and 14 and a forwardmost bar 15 carried by supports 16 affixed to and extending forwardly from frame beam 11. Conventional flexible earthworking tools 17 are mounted in staggered relation on bar 15 and beams 11 and 12. Receptacles 18 are mounted on the frame and are adapted for dispensing soil-treating materials, such as fertilizer, to the ground disturbed by the tools 17.

Laterally spaced pairs of vertically spaced generally parallel links 19 and 20 are pivotally connected at their forward ends to a bracket 21 affixed to beam 12, and their rear ends are pivotally connected to an upright 22 secured to the ends of a transverse beam 23.

Planter units 24 are mounted at spaced locations on beam 23, and each includes a furrow opener unit 25, a seed hopper 26, and a combination drive and gauge wheel 27. Each unit is provided with laterally spaced plates 28 to each of which is pivotally connected the rear ends of a pair of vertically spaced parallel links 29 and 30, the forward ends are pivotally connected to a bracket 31 secured to beam 23.

For use in the operating position of the implement shown in FIGS. 1 and 2, the implement is provided with a draft tongue 32 pivotally connected to the drawbar 33 of a tractor 34. Laterally spaced supporting wheels 35 are mounted at the rear ends of arms 36, the forward ends of which are secured to a shaft 37 carried by brackets 38 depending from beam 12. A rock arm 39 mounted on shaft 37 is connected to one end of a hydraulic ram 40, the other end of which is anchored to one of a pair of angle bars 41 affixed to frame members 11 and 12. Fluid under pressure to extend or retract ram 40 is supplied through hose lines 42 from a source on the tractor.

Ram 40 includes a cylinder 43 and a piston rod 44, and extension of the piston rod causes the wheel-carrying arms 36 to swing downwardly relative to the implement frame to raise the latter to a transport position with all earthworking elements elevated above the ground. During operation wheels 35 also function as gauge wheels to regulate the depth of operation of the earthworking tools 17.

In order to limit the downward swinging of links 19 and 20 when the implement is raised, a stopblock 45 is affixed to bracket 22 and is engageable with the rear end of lower link 20. Similarly, to prevent collapse of links 29 and 30 supporting planter units 24, a stopblock 46 is affixed to bracket 31 and is engageable with upper link 29. Thus, upon swinging wheel-carrying arms 36 downwardly relative to the main frame, links 19, 20 and 29, 30 remain substantially intact and planter units 24 are elevated above the ground along with earthworking teeth 17.

The forward end of implement hitch or drawbar 32 carries a vertical hitch pin 47 having at its lower end a clevis 48 in which is received the drawbar 33. Drawbar 32 is square in cross section and is slidably received between the spaced upright flanges 49 of angle bars 41 having horizontal flanges 50.

As will be observed from FIGS. 2 and 3, the rear end of drawbar 32 is provided with longitudinally spaced transverse openings 51 and 52 adapted to register, respectively, with openings 53 and 54 in flanges 49 to receive bolts 55 and 56 held in place by nuts 57 and 58. When the harrowing and planting operation is completed the implement is converted for endwise transport by actuating ram 40 to swing wheel arms 36 downwardly relative to the frame to raise the implement and the clevis 48 is disconnected from tractor drawbar 33. Bolts 55 and 56 are removed and drawbar 32 telescoped rearwardly until openings 53 and 54 in the flanges 49 register respectively with longitudinally spaced openings 59 and 60 at the forward end of the drawbar. Bolts 55 and 56 are then reinserted.

Vertical displacement of drawbar 32 from between angle bars 41 is prevented by the provision of pins 61 and 62 seated in openings provided in spaced pairs of ears 63 and 64 projecting upwardly from flanges 49, pins 61 and 62 being preferably mounted for rotation to reduce the friction of engagement with the upper surface of drawbar 32 when telescoping from one position to the other.

With the implement drawbar 32 in the position of FIG. 6 and the earth-engaging elements 17, 25, and 27 elevated above the ground and supported on wheels 35, the tractor is shifted to its transport position and connection made with a clevis 65 comprising a pin 66 and an angle 67 mounted at the forward end of a draft bar 68 pivotally connected at 69 to a bracket 70 affixed to the right-hand end of frame member 12, another pin 71 being provided to lock draft bar 68 in the nonoperating position shown in FIG. 2. An additional pin 72 locks draft bar 68 to the implement frame in the transport position of FIG. 6 to support the elevated right-hand end of the implement on the tractor.

A pair of endwise transport wheels 73 and 74 are provided for supporting the left-hand end of the implement, wheel 73 being mounted on an arm 75 pivotally mounted on a pin 76 between a pair of downwardly and rearwardly angled plates 77 affixed to frame member 13. As shown in FIG. 6, in the transport position of the implement wheel 73 is locked in place parallel to the direction of travel of the tractor and perpendicular to the vertical plane of wheels 35 and is locked in position by a pin 78 between plates 77. Wheel 74 is similarly mounted at the end of an arm 79 between a pair of vertical plates 80 secured to frame member 13 and is similarly locked in the transport position of FIG. 6. With the now forward end of the implement being supported on the tractor drawbar and the rear of the implement being supported on transport wheels 73 and 74, ram 48 is again actuated by retraction of the piston rod and the cylinder to swing wheel-carrying arm 36 upwardly.

To reconvert the implement to operation the foregoing procedure is reversed, pin 78 being removed and arm 75 swung upwardly until the opening in arm 75 receiving the pin 78 registers with an opening 81 in plate 77. Arm 79 is similarly swung upwardly and locked in place by means not shown.

What is claimed is:

1. In a tractor-connected implement having a frame elongated transversely of the direction of travel in the operating position and having transport hitch means at one end for optional connection to the tractor in endwise relation to reduce the transport width of the implement, a centrally disposed operating hitch comprising an elongated hitch tongue projecting forwardly from the frame in the operating position thereof, means on the forward end of said tongue for connecting it to the tractor, said tongue being slidably supported on said frame such that it is retractable toward said frame in cooperating relationship with said transport hitch means to reduce the transport width of the implement, restraining means carried by said frame and operatively engageable with the upper surface of said tongue during the telescoping thereof, securing means adapted to preclude the retraction of said tongue from its operating position to a nonoperating position, said securing means being releasable to facilitate the retraction of said tongue when the transportation of said implement is required, and guide means mounted on said frame accommodating the retraction of said tongue horizontally rearwardly from its operating position upon release of said securing means to a nonoperating position, said guide means including a pair of laterally spaced longitudinally extending vertical plate members slidably receiving and laterally confining said tongue, said securing means being optionally operable to secure the tongue to the frame in said retracted nonoperating position.

2. The invention set forth in claim 1, wherein said securing means includes registering apertures in said plate members and in the forward and rearward portions of said tongue and pin means insertable in the apertures in said plate members and optionally receivable in the front and rear apertures in said tongue.

* * * * *